United States Patent

[11] 3,604,941

| [72] | Inventor | James N. Crum<br>Stonington, Conn. |
|---|---|---|
| [21] | Appl. No. | 877,700 |
| [22] | Filed | Nov. 18, 1969 |
| [45] | Patented | Sept. 14, 1971 |
| [73] | Assignee | Harris-Intertype Corporation<br>Cleveland, Ohio |

[54] SYSTEM FOR SENSING INDICIA ON MOVING MEMBERS
8 Claims, 1 Drawing Fig.

[52] U.S. Cl. ................................................ 250/219,
210/214 R, 235/61.11 E
[51] Int. Cl. .................................................. G08c 9/06
[50] Field of Search .......................................... 250/219 D,
219 DC, 227, 206, 214, 212; 235/61.11 E, 61.11 C

[56] References Cited
UNITED STATES PATENTS

| 2,804,574 | 8/1957 | Kingsbury ................... | 250/206 X |
| 3,053,985 | 9/1962 | Grammer, Jr. et al. ....... | 250/212 |
| 3,180,988 | 4/1965 | Burkhardt et al. ............ | 250/219 X |
| 3,424,913 | 1/1969 | Hesse ............................ | 235/61.11 X |
| 3,461,300 | 8/1969 | Braun ............................. | 250/219 |
| 3,474,232 | 10/1969 | Hearn et al. ................... | 250/219 X |

*Primary Examiner*—Walter Stolwein
*Attorney*—Yount and Tarolli

ABSTRACT: A system for sensing a register mark, or other indicia, which, for example, may be associated with a high-speed web-fed printing press, provides a signal which indicates the passage of the register mark past a conventional sensor. The signal from a conventional amplifier coupled to the sensor is coupled through an operational amplifier that has a varistor connected between its inverting input and its output to an emitter-follower circuit that has a threshold adjustment resistor in its emitter path to ground. The output of the emitter-follower circuit is coupled to an RC differentiating circuit and the differentiating circuit is coupled to a second operational amplifier. The second operational amplifier has a Zener diode connected between its inverting input and its output and it produces an output voltage which is close to ground when the differentiated signal is of one polarity and an output pulse signal which is independent of width of the sensed signal, and which occurs essentially simultaneously with the occurrence of a peak magnitude of the sensed signal which is provided by the conventional sensor-amplifier combination, when the differentiated signal changes to the other polarity.

PATENTED SEP 14 1971
3,604,941
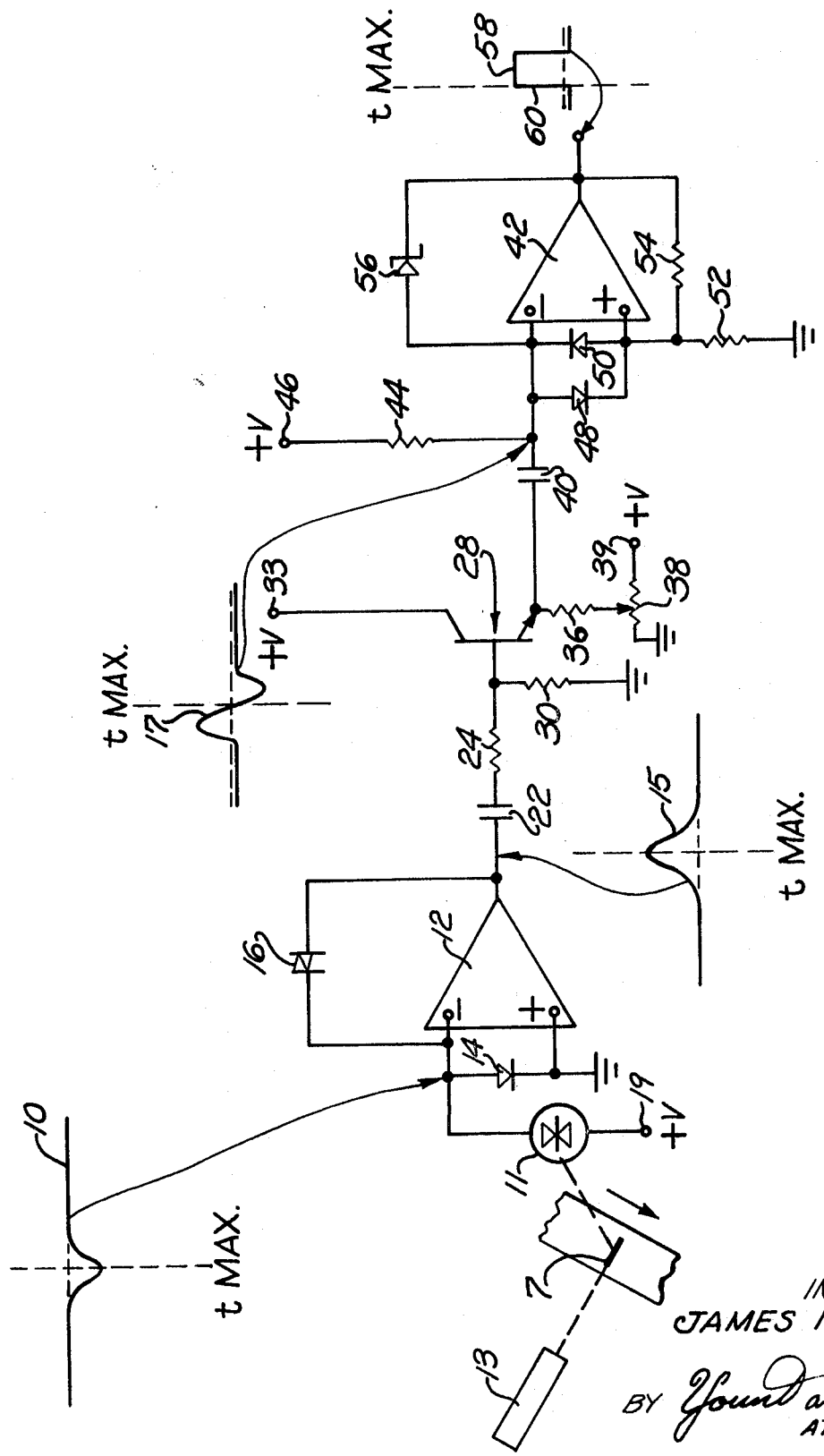
INVENTOR
JAMES N. CRUM
BY Young and Tarolli
ATTORNEYS

SYSTEM FOR SENSING INDICIA ON MOVING MEMBERS

BACKGROUND AND OBJECTS OF THE INVENTION

Various signal-processing circuits and sensing devices have been employed to sense register marks, and other indicia, in order to provide a desired registration of moving strips or moving webs. For example, registration control of vertical printing requirements on high-speed, high quality, web-fed printing presses and other devices, has been accomplished by sensing register marks with optical sensors. Sensing systems for register marks, another indicia, have been developed using conventional optical sensors, such as photosensitive diodes, for example, which are dependent on the amplitude or the width of the sensed signal produced by a sensor-amplitude or width dependent sensing circuits, however, are subject to error when the amplitude or width of the sensed signal changes due to changes in the reflectivity of the ink or paper, in the illumination of the source or in the sensitivity of the sensor or the amplifier circuit.

Sensing systems to overcome the above-mentioned problems employing complex optical system and lens design techniques are too expensive and complicated for many applications. The disclosed invention provides a relatively inexpensive and simple way of accurately sensing the passage of a register mark, or other indicia, which is in motion relative to the sensor.

It is an object of the present invention to provide a signal-processing circuit for a sensed signal produced by a register mark, or other indicia, which is relatively immune to amplitude or width variations of the sensed signal wherein the signal is differentiated and is coupled to a detecting device, preferably an operational amplifier, which initiates an output pulse that is representative of the register mark, or other indicia, at the time and sensed signal reaches its peak magnitude.

It is a further object of the present invention to provide a signal-processing circuit for a sensed signal from a register mark, or other indicia, which is relatively immune to amplitude or width variations of the sensed signal wherein a signal which exceeds a predetermined level is differentiated and is coupled to a detecting device, preferably operational amplifier, which initiates an output pulse essentially simultaneously with the occurrence of a peak magnitude of the sensed signal.

It is an additional object of the present invention to provide a signal-processing circuit for a sensed signal from a register mark, or other indicia, which is relatively immune to amplitude or width variations of the sensed signal wherein the signal is coupled through a first operational amplifier that has a variable gain characteristic, with increased gain occurring at low input signal levels, and the output signal of the first operational amplifier is coupled through an emitter-follower circuit having a threshold adjustment resistor to a differentiating circuit which is coupled to a second operational amplifier that initiates an output pulse when the sensed signal is at a peak magnitude.

BRIEF DESCRIPTION OF THE DRAWING

The FIGURE is a schematic of an embodiment of the disclosed invention.

TECHNICAL DESCRIPTION OF THE INVENTION

A register mark 7 in the FIGURE is shown as a dark mark on the white background of a moving web of a web-fed printing press, or other moving member, which moves past a photosensing diode 11. As the register mark 7 moves past the photosensing diode 11 the amount of reflected light which is received by the diode from the light source 13 is reduced so that the amount of current the flows through the photosensitive diode 11 from the positive voltage power supply which is coupled to the terminal 19 decreases. When the current through the photosensitive diode 11 decreases, a negative voltage pulse as shown by the negative-going waveform 10 is coupled to the inverting input of an operational amplifier 12 which provides amplification over a wide range of sensed signals because of a voltage dependent nonlinear resistor or varistor 16 which is coupled between the output and inverting input of the operational amplifier 12. As the input voltage decreases the resistance of the varistor 16 increases, thereby increasing the gain of the operational amplifier 12 at low input voltage levels so as to provide more nearly constant output signals at varying input voltage levels. A diode 14, which has its anode connected to the inverting input terminal and its cathode connected to the ground noninverting input terminal of the operational amplifier 12, protects the operational amplifier 12 from being overdriven.

The positive-going waveform 15 which is produced by the operational amplifier 12 is coupled to the base of an NPN emitter-follower transistor 28 through a coupling capacitor 22 and a base current-limiting resistor 24 and the signal voltage is developed across a resistor 30 which is coupled between the base and ground. The collector of the transistor 28 is connected to a terminal 33 which is coupled to a positive voltage supply and the emitter of the transistor 28 is connected to a fixed resistor 36 which is connected at its other end to the sliding tap of a potentiometer 38. The potentiometer 38 has one end connected to ground and its other end is connected to a terminal 39 which is coupled to a positive voltage supply that biases the transistor 28 beyond cutoff since the base of the transistor 28 is nominally at a ground potential level. Adjustment of the potentiometer 38 determines the threshold level for the transistor 28 in order to minimize the coupling of erroneous signals due to variations in paper reflectivity, paper flutter, etc., to the emitter of the transistor 28.

The signal on the emitter of the emitter-follower transistor 28 has a waveform which is similar in shape to the waveform 17 once the threshold level is exceeded and this waveform is differentiated by the differentiating circuit consisting of a capacitor 40 and the effective low resistance of the summing junction of amplifier 42. The amplifier 42 functions as a conventional operational amplifier differentiating circuit as long as the Zener diode 56 is forward biased. In the absence of an input signal, forward bias on the Zener diode 56 is maintained by the resistor 44 which is connected to the terminal 46 which is coupled to a positive voltage supply, therefore, the output voltage of the operational amplifier 42 will be at a small negative potential at this time.

As the signal on the base of the transistor 28 increases in a positive direction, the point where the base-emitter junction is forward biased is reached, and the signal on the emitter follows the signal on the base. When the differentiated waveform 17 changes from a positive to a negative polarity, which occurs at the positive peak of the signal waveform 15, the output of the operational amplifier 42 becomes positive in potential, causing the Zener diode 56 to become reverse biased and to switch into its high impedance state, thereby greatly increasing the gain of the operational amplifier 42. The gain of the operational amplifier is further increased by the positive feedback provided by resistors 54 and 52, which becomes effective when the Zener diode 56 is reversed biased. This causes the amplifier output voltage to increase very rapidly until the Zener voltage level of Zener diode 56 is reached. At this point, Zener diode 56 conducts in the reverse direction and the output voltage of amplifier 42 is clamped at the Zener voltage level. The resulting output voltage pulse 58, has a leading edge 60 which occurs substantially simultaneously with the minimum magnitude of the input waveform 10 (i.e. the point where the waveform 10 reaches a negative peak at its lease positive voltage) and which is substantially independent of the magnitude and width of the input waveform 10. The polarity of the input waveform is not a limitation and modifications that will be apparent to those skilled in the art may be applied to the disclosed invention to provide a system which produces an output pulse when the input waveform has a positive peak.

Diodes 48 and 50 which are oppositely poled, are connected across the inverting and the noninverting inputs of the operational amplifier 42 to prevent the operational amplifier 42 from being overdriven.

What is claimed is:

1. In an indicia-sensing system for sensing indicia on a moving member; sensing means for producing a first time variable level signal which changes from a first level in a first direction to a peak level and then back in a second direction toward said first level on relative movement of the indicia and the sensing means past each other, means for differentiating the first signal produced by the sensing means to obtain a differentiated signal and means responsive to the differentiated signal for producing an output pulse having its leading edge occurring substantially at the point in time when the first signal has reached its peak level.

2. In an indicia-sensing system as defined in claim 1 means to prevent the first signal from being coupled to the differentiating means until the first signal crosses a predetermined level.

3. In an indicia-sensing system as defined in claim 1, a system wherein the differentiated signal undergoes a change of polarity with respect to a reference polarity level and the leading edge of the output pulse occurs substantially when the differentiated signal crosses the reference polarity level and the first signal has reached its peak level.

4. In an indicia-sensing system as defined in claim 2, a system wherein the differentiated signal undergoes a change of polarity with respect to a reference polarity level and the leading edge of the output pulse occurs substantially when the differentiated signal crosses the reference polarity level and the first signal has reached its peak level.

5. In s system or sensing register marks on a moving web, a light-source means for directing light onto the register marks and the web, optical sensing means for producing a first time variable level signal pulse which changes in a first direction from a first level to a peak level and then back in a second direction toward said first level in response to the light received by the optical sensing means from a register mark on the web as it moves past the optical sensing means, means for differentiating the first pulse signal to obtain a differentiated signal and means responsive to the differentiated signal for producing an output pulse having its leading edge occurring substantially at the point in time when the first signal pulse has reached its peak level.

6. In an indicia-sensing system as defined in claim 5 means to prevent the first signal from being coupled to the differentiating means until the first signal crosses a predetermined level, wherein the predetermined level is a threshold level that prevents erroneous signals caused by optical conditions from being coupled to the differentiating means.

7. In an indicia-sensing system as defined in claim 5, s system wherein the differentiated signal is a voltage signal which undergoes a change of polarity with respect to a reference polarity level and the leading edge of the output pulse occurs substantially when the differentiated signal crosses the reference polarity level and the first signal pulse has reached its peak level.

8. In an indicia-sensing system as defined in claim 6, a system wherein the differentiated signal is a voltage signal which undergoes a change of polarity with respect to a reference polarity level and the leading edge of the output pulse occurs substantially when the differentiated signal crosses the reference polarity level and the first signal pulse has reached its peak level.